(12) United States Patent
Chien

(10) Patent No.: US 6,224,113 B1
(45) Date of Patent: May 1, 2001

(54) LOCKING DEVICE FOR A QUICK RELEASE COUPLING

(76) Inventor: Kuo-Piao Chien, 4 Fl., No. 30, Lane 117, Tien-Mu W. Rd., Taipei (TW)

( * ) Notice: Subject to any disclaimer, the term of this patent is extended or adjusted under 35 U.S.C. 154(b) by 0 days.

(21) Appl. No.: 09/432,315

(22) Filed: Nov. 2, 1999

(51) Int. Cl.7 ................................................. F16L 37/20
(52) U.S. Cl. ............................. 285/85; 285/87; 285/312
(58) Field of Search ............................ 285/312, 87, 88, 285/85

(56) References Cited

U.S. PATENT DOCUMENTS

| | | | | |
|---|---|---|---|---|
| 4,222,593 | * | 9/1980 | Lauffenburger | 285/312 |
| 4,295,670 | * | 10/1981 | Goodall et al. | 285/312 |
| 4,802,694 | * | 2/1989 | Vargo | 285/87 |
| 5,816,623 | * | 10/1998 | Chang | 285/88 |
| 5,911,445 | * | 6/1999 | Lee | 285/312 |
| 6,015,168 | * | 1/2000 | Fahl | 285/88 |
| 6,047,995 | * | 4/2000 | Kotake | 285/312 |
| 6,053,540 | * | 4/2000 | Meyer | 285/88 |
| 6,120,065 | * | 9/2000 | Chen | 285/312 |

* cited by examiner

Primary Examiner—Eric K. Nicholson
(74) Attorney, Agent, or Firm—William E. Pelton, Esq.

(57) ABSTRACT

A locking device for a quick release coupling includes a coupling, a lever and a sleeve containing an arcuate groove therein. The sleeve is attached to the coupling and the lever is pivotally mounted on the coupling. The coupling includes at least two pairs of supports with each pair containing a groove therein to receive the lever. A pivot pin penetrates the lever to pivotally mount the lever on the support and a locking pin is attached to the pair of supports and received in the groove of the support. The lever includes a cam formed on one end to abut the arcuate groove of the sleeve and a recess formed in the other end to receive a linkage. The recess of the lever contains an opening to allow the linkage to extend through the lever and has an indentation to receive the locking pin when the lever is pulled down flush to the coupling. A torsion spring is pivotally mounted on the lever by the pin and has a first end abutting the first end of the linkage and a second end abutting the lever. One end of a rod is attached to the second end of the linkage, and the other end of the rod is attached to a ring.

1 Claim, 7 Drawing Sheets

LOCKING DEVICE FOR A QUICK RELEASE COUPLING

BACKGROUND OF THE INVENTION

1. Field of the Invention

The present invention relates to a locking device for a quick release coupling, and more particularly to a locking device for a quick release coupling that can be operated and produced more easily.

2. Description of Related Art

A conventional locking device (50) for a quick release coupling in accordance with the prior art shown in FIG. 6 and FIG. 7 comprises a sleeve (51) having an arcuate groove (511) defined therein, a connecting member (60), a lever (70) and a coupling (80). The connecting member (60) includes at least two pairs of supports (61) extending therefrom and a pivot pin (62) mounted on each pair of supports (61). A lever (70) is pivotally mounted on the connecting member (60) and held in place by the pivot pin (62).

The lever (70) includes a cam (71) formed on one end and a recess (72) defined in the other end. The cam (71) is received in the arcuate groove (511) of the sleeve (51). The recess (72) of the lever (70) includes a first flange (721) on one end extending radially inwardly and forming a first hole (722) and a ring (723) containing a second hole (724) pressed into the other end. The lever (70) further includes a locking rod (73) received in the recess (72). The locking rod (73) has one end extending through the bole (722) in the flange (721), the other end connected to a ring (74) and a locking ring (731) having one side abutting the interior of the first flange (721). A spring (732) received in the recess (72) and around the locking rod (73) has one end abutting the second side of the locking ring (731) and the other end abutting the interior of the ring (723) at the end of the recess (72). Each coupling (80) includes a bracket (81) with a locking bole (811) to receive the end of the locking rod (73) that extends through the flange (721) at the end of the recess (72).

To connect the locking device for a quick release coupling (50), the sleeve (51) is inserted into the connecting member (60), and the lever (70) is rotated down to insert the cam (71) tightly into the arcuate groove (511). The more the lever (70) is pulled down, the more the sleeve (51) securely squeezes the connecting member (60) to prevent fluid from leaking out of the locking device (50) for a quick release coupling. As the lever (70) is pulled down, the bracket (81) presses the locking rod (73) into the recess (72) and compresses the spring (732). Referring to FIG. 7, as the end of the locking rod (73) aligns with the locking hole (811) of the coupling (80), the resilience of the compressed spring (732) presses the locking rod (73) into the locking hole (811) to prevent the sleeve (51) from detaching from the connecting member (60).

With reference to FIG. 6, to detach the locking device (50) for a quick release coupling, the locking rod (73) is pulled by the ring (74) to make the end of the locking rod (73) come out of the locking hole (811) of the coupling (80). Then the lever (70) is pulled up to detach the cam (71) from the arcuate groove (511) of the sleeve (51). The sleeve (51) can be pulled out of the connecting member (60) when the cam (71) is detached from the arcuate groove (511) of the sleeve (51)

However, there are several disadvantages with the conventional locking device (50) for a quick release coupling.

1. It is difficult to produce. The coupling (80) includes at least two brackets (81) each containing a locking hole (811). Consequently, the mold to fabricate the coupling (80) is complicated. It will cost the manufacturer a lot of money.

2. It is hard to assemble. The locking rod (73) is received in the recess (72) and has a spring (732) abutting the locking pin (731) and the ring (723) of the recess (72). The assembly process is complicated and wastes much time.

The present invention has arisen to mitigate and/or obviate the disadvantage of the conventional locking device for a quick release coupling.

SUMMARY OF THE INVENTION

In accordance with one aspect of the present invention, a locking device for a quick release coupling that is easy to operate and produce is provided.

The locking device for a quick release coupling in accordance with the present invention comprises a coupling including at least two pairs of supports each having a locking pin attached thereto. A lever includes has a recess to receive a torsional spring and a linkage therein. The linkage holds the lever in place by the locking pin when the lever is pressed against the sleeve.

Further benefits and advantages of the present invention will become apparent after a careful reading of the detailed description with appropriate reference to the accompanying drawings.

DETAILED DESCRIPTION OF THE INVENTION

Figure 1:
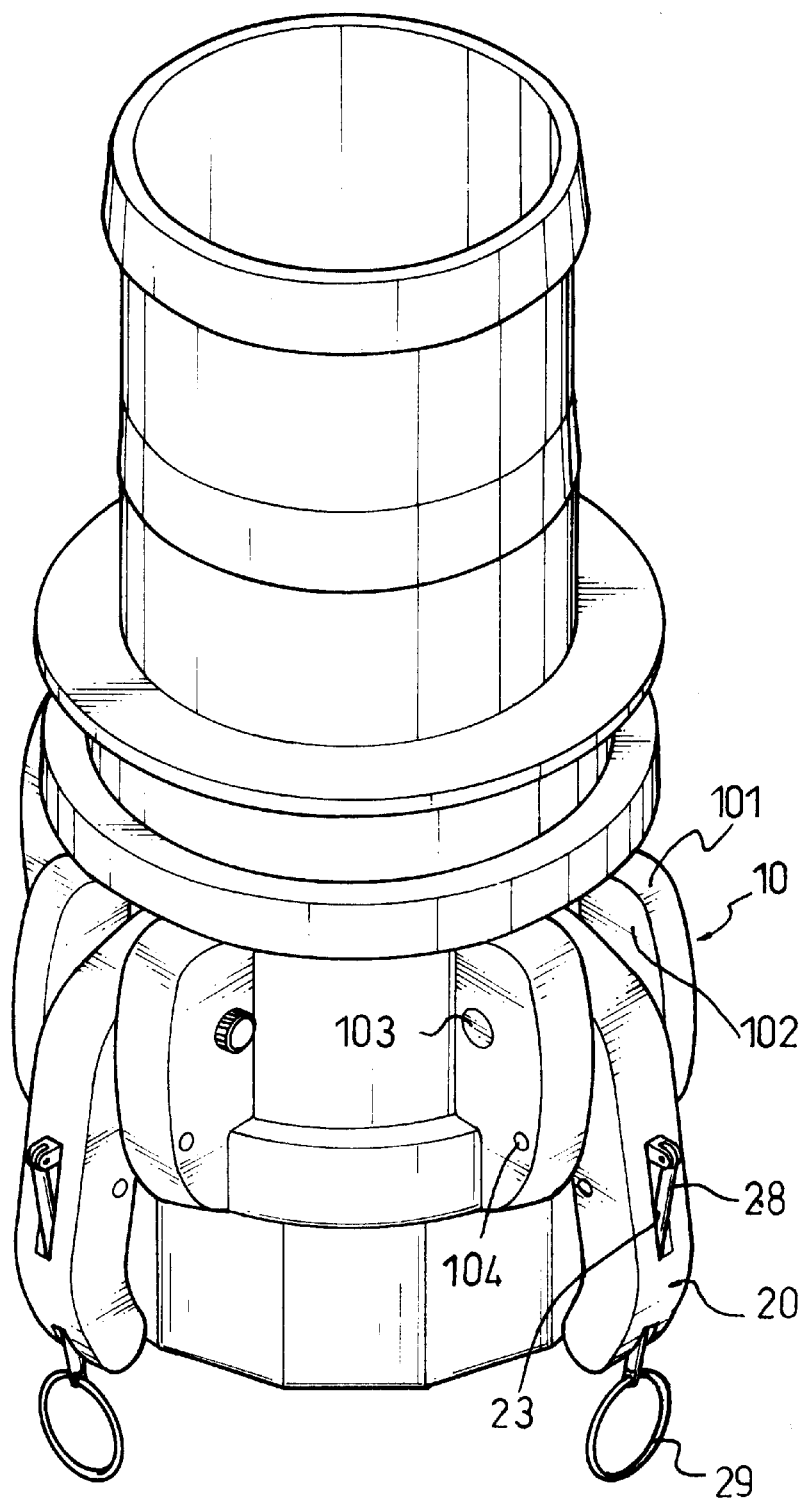
FIG. 1 is a perspective view of a locking device for a quick release coupling in accordance with the present invention.
Figure 2:
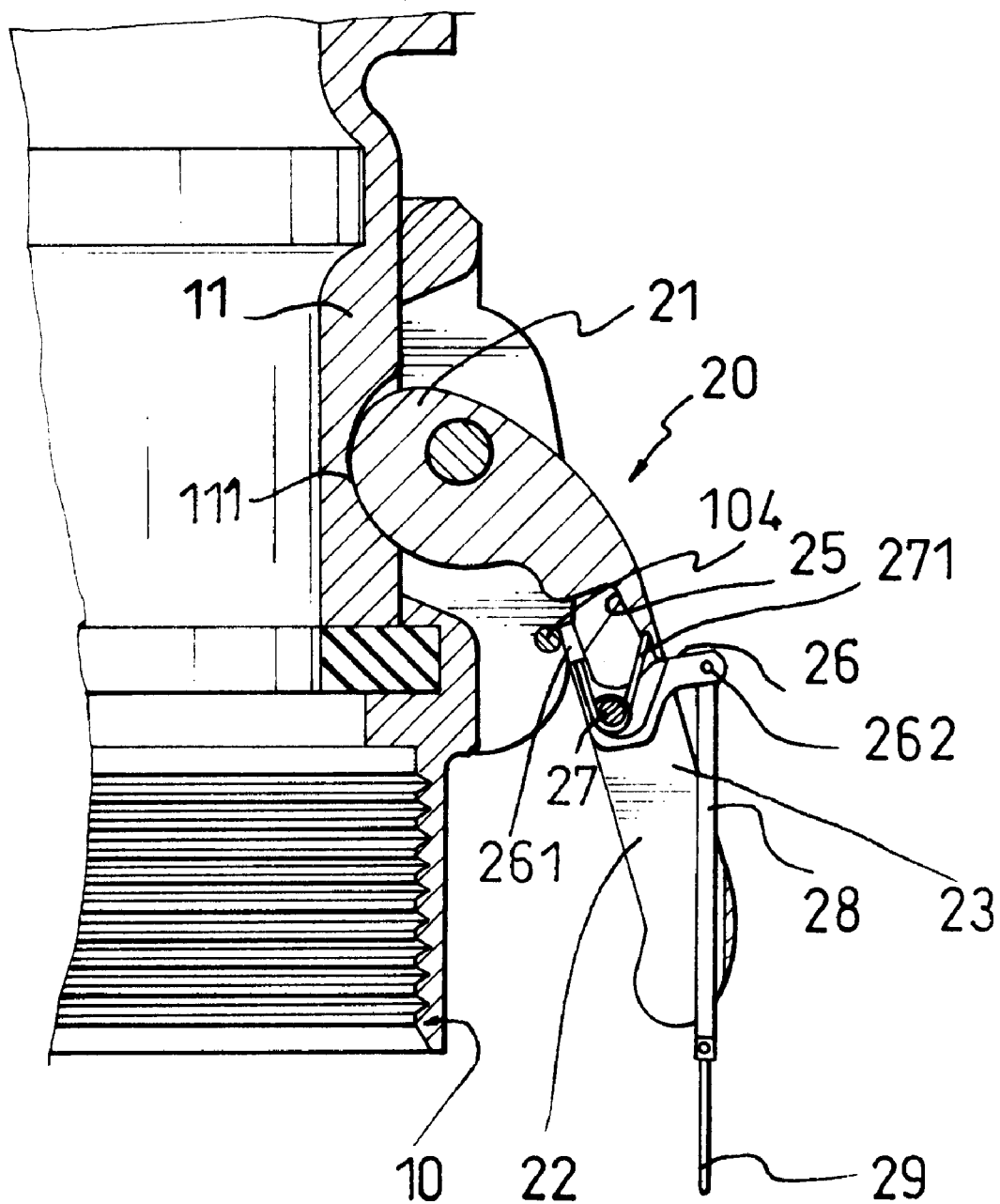
FIG. 2 is a plan view in partial section of the locking device for a quick release coupling in FIG. 1.

Referring to the drawings and initially to FIG. 1 and FIG. 2, a locking device for a quick release coupling in accordance with the present invention comprises a coupling (10), a lever (20) and a sleeve (11) containing an arcuate groove (111) therein. The sleeve (11) is attached to the coupling (10), and the lever (20) is pivotally mounted on the coupling (10).

The coupling (10) includes at least two pairs of supports (101) each pair forming a groove (102) to receive the lever (20). A pivot pin (103) penetrates the supports (101) to pivotally mount the lever (20) in the groove (102) between the supports (101), and a locking pin (104) is attached to the pair of supports (101) across the groove (102) between the supports (101).

The lever (20) includes a cam (21) formed on one end to abut the arcuate groove (111) of the sleeve (11) and a recess (22) in the other end to receive a linkage (26). The recess (22) contains an opening (23) to allow the linkage (26) to extend through the lever (20) and has an indentation (25) to receive the locking pin (104) when the lever (20) is pressed down flush to the coupling (10). The linkage (26) is pivotally mounted on the lever (20) by a pin (27) and has a first end (261) abutting the locking pin (104) and a second end (262) extending through the opening (23). A torsion spring (271) is pivotally mounted on the lever (20) by the pin (27) and has a first end abutting the first end (261) of the linkage (26) and a second end abutting the lever (20). A rod (28) has one end attached to the second end (262) of the linkage (26) and a second end attached to a ring (29).

Figure 3:
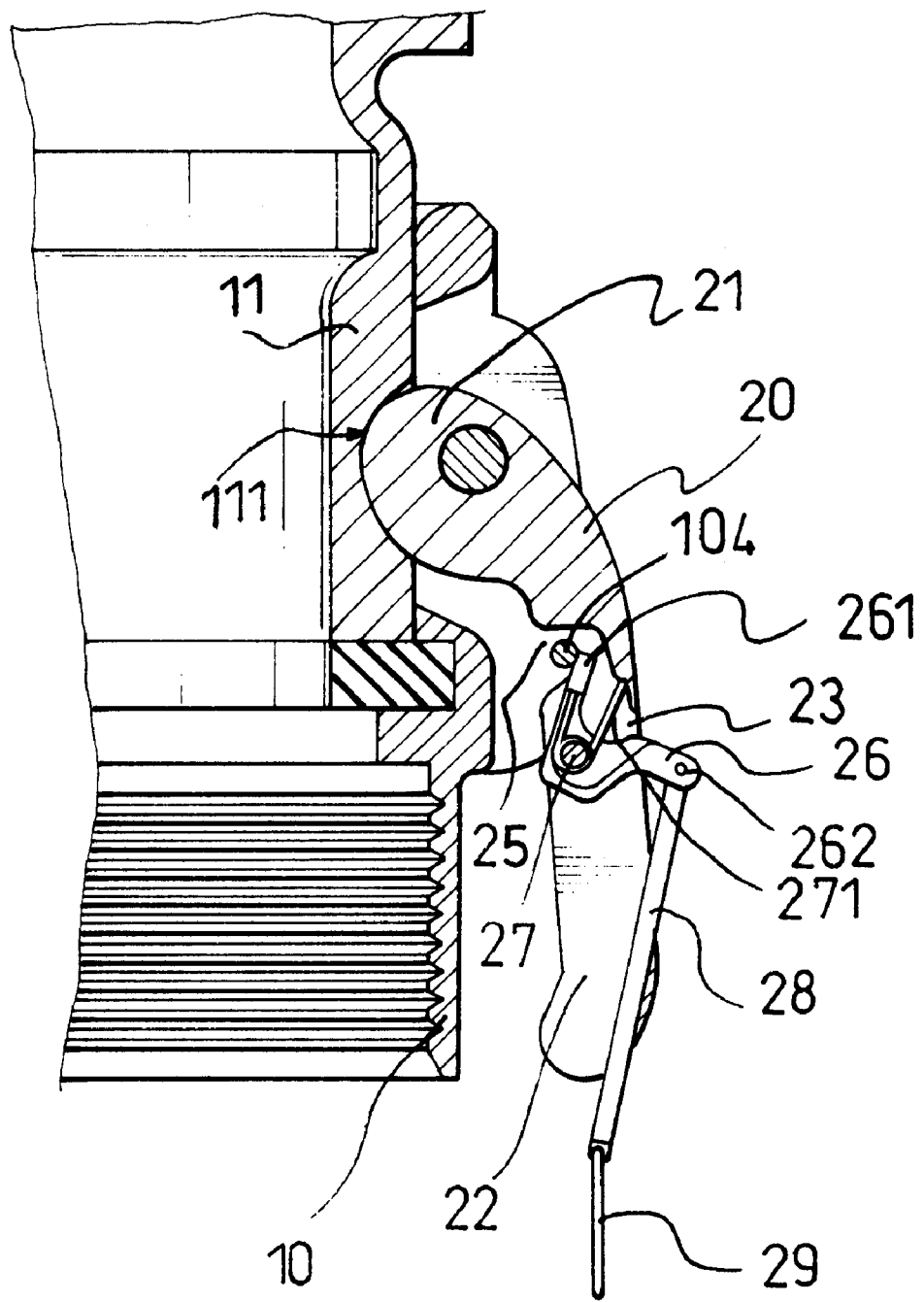
FIG. 3 is a plan view in partial section of the locking device for a quick release coupling in FIG. 1 with the linkage hooked over the locking pin.

With reference to FIG. 3, to connect the locking device for a quick release coupling, the lever (20) is pulled down toward the coupling (10), and the first end (261) of the linkage (26) will press the torsional spring (271) after abutting the locking pin (104).

Figure 4:
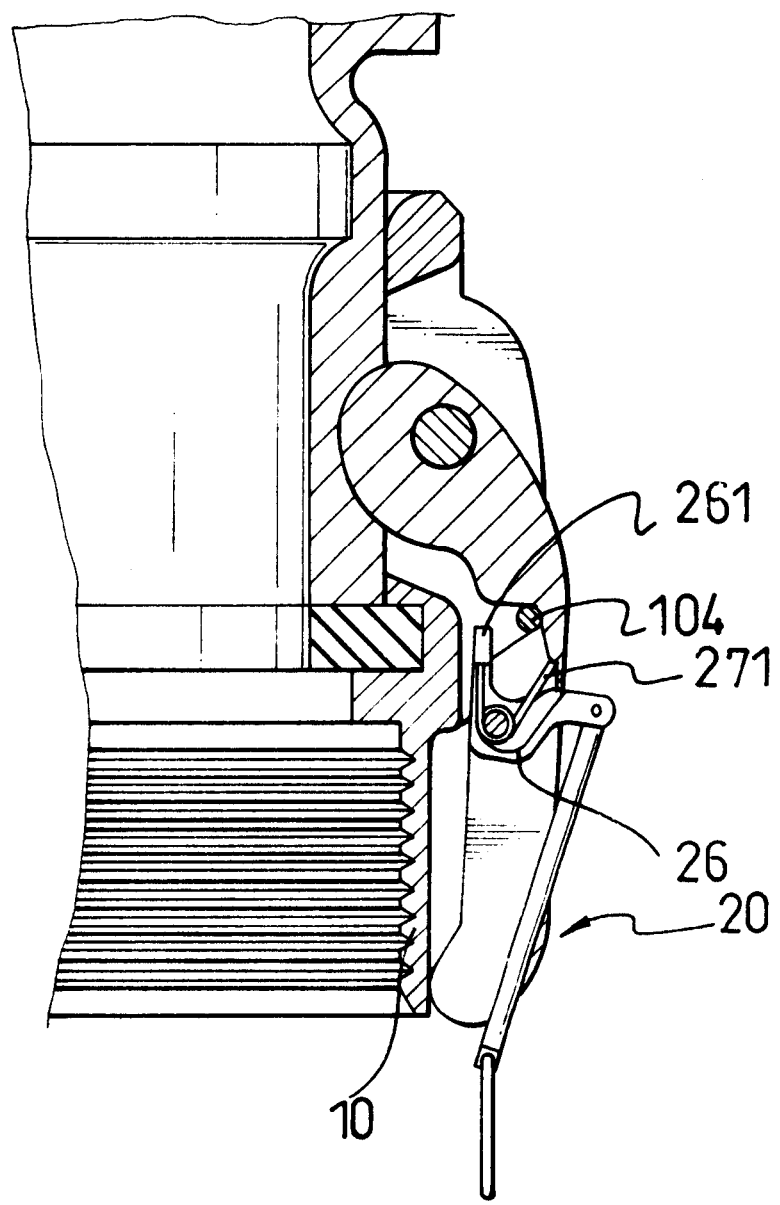
FIG. 4 is a plan view in partial section of the locking device for a quick release coupling in FIG. 1 being connected and locked.

With reference to FIG. 4, by continuing to press the lever (20) until it abuts the coupling (10), the spring (271) and the first end (261) of the linkage (26) are deflected and pass over the locking pin (104). If the lever (20) is pulled up without rotating the linkage (26), the first end (261) of the linkage (26) abuts the locking pin and the second end (262) of the linkage (26) abuts the top of the opening (23), thereby keeping the cam (21) from disengaging from the groove (111) in the sleeve (11).

Figure 5:
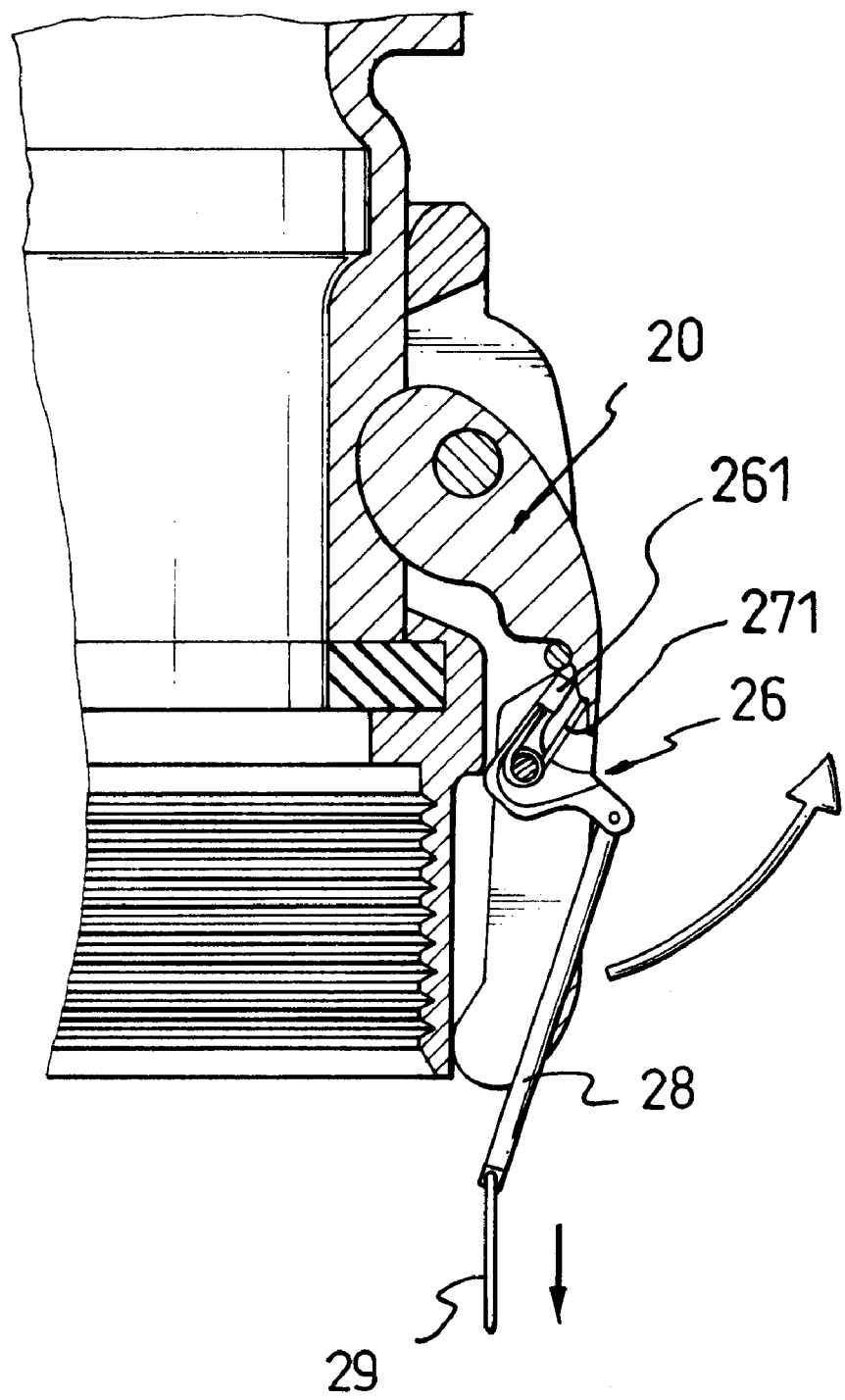
FIG. 5 is a plan view in partial section of the locking device for a quick release coupling in FIG. 1 with the linkage unlocked.

With reference to FIG. 5, to detach the locking device for a quick release coupling, the rod (28) is pulled down by the ring (29), and the linkage (26) rotates and compresses the torsion spring (271). The first end (261) of the linkage (26) moves past the locking pin (104), thereby allowing tie lever to be pulled up the lever (20) and detach the locking device for a quick release coupling.

The locking device for a quick release coupling has several advantages.

Figure 6:
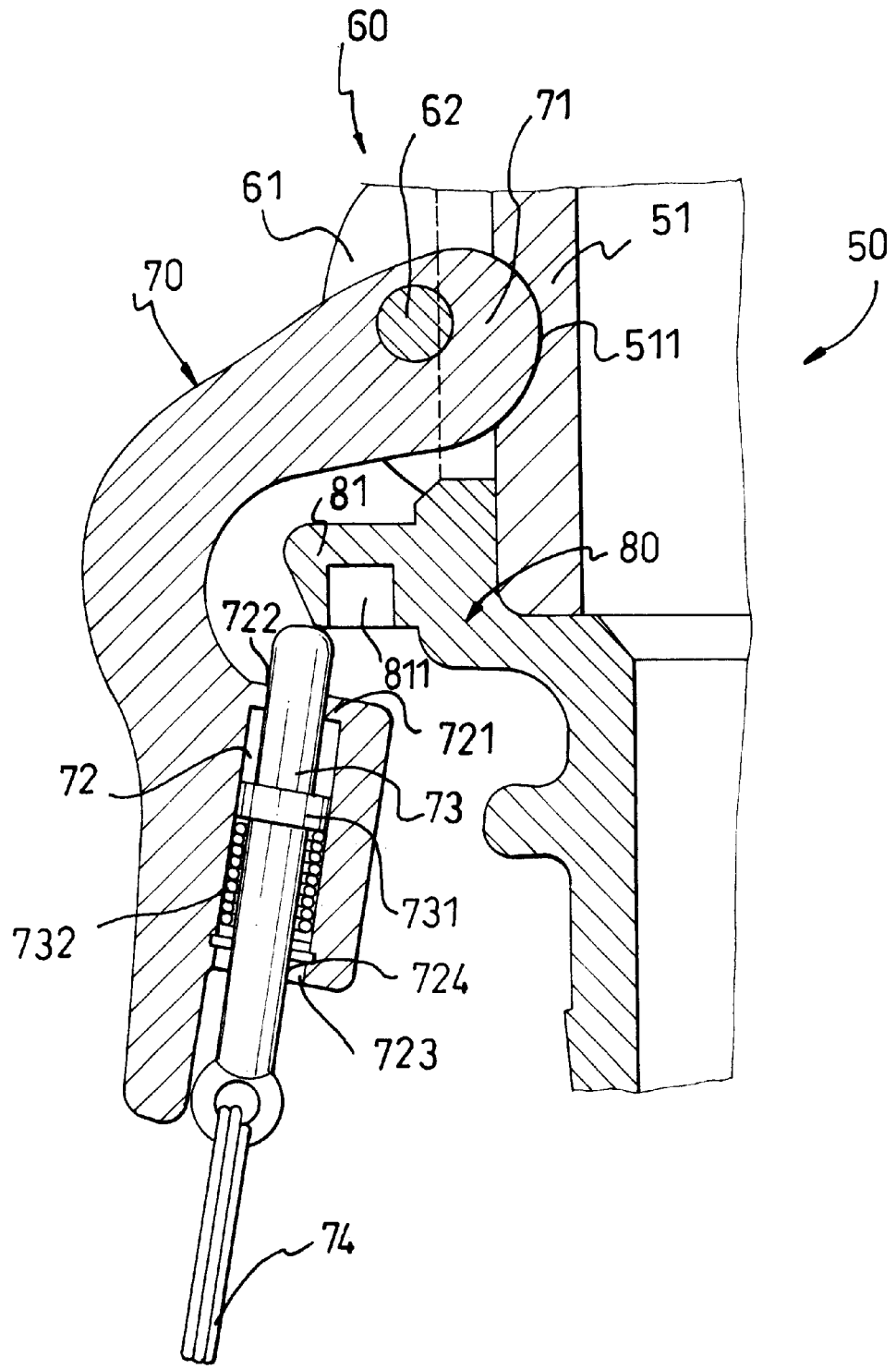
FIG. 6 is a plan view in partial section of a conventional locking device for a quick release coupling in accordance with the prior art.
Figure 7:
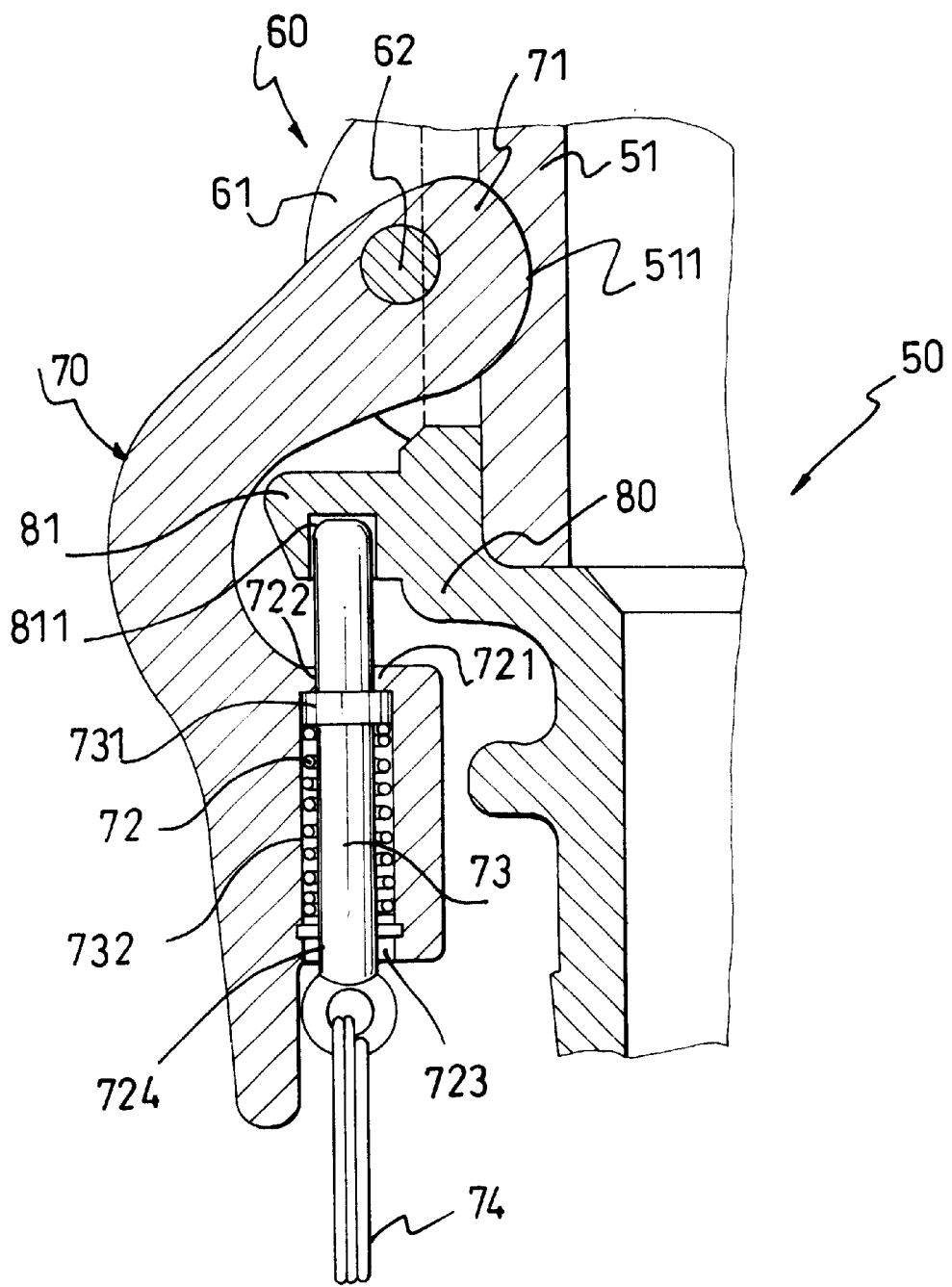
FIG. 7 is a plan view in partial section of the conventional locking device for a quick release coupling with the sleeve and the connecting member connected.

1. The locking device for a quick release coupling only attaches a locking pin (104) to the support (101) of the coupling (10), and the lever (20) can be held in place by the locking pin (104). Therefore, as shown in FIG. 6, the bracket (81) of the prior art is unnecessary to the locking device for a quick release coupling. Consequently, the locking device for a quick release coupling can be more easily produced.

2. The torsion spring (271) and the linkage (26) are attached to the lever (20) by the pin (27). Therefore, the locking device for a quick release coupling is easy to be assembled.

Although the invention has been explained in relation to its preferred embodiment, it is to be understood that many other possible modification and variation can be made without departing from the spirit and scope of the invention as hereinafter claimed.

What is claimed is:

1. A locking device for a quick release coupling extendable between a locked position and an unlocked position, said locking device comprising:

a coupling including at least two pairs of supports each pair containing a groove therein and a locking pin mounted therein;

a sleeve attached to said coupling and having an arcuate groove defined therein;

a lever pivotally mounted on each of said pairs of supports and including a cam formed to abut said arcuate groove of said sleeve, a recess with an opening defined in a bottom defining said recess, a pin, a rod having a first end and a second end attached to a ring, and an indentation defined to receive said locking pin when the lever is pulled to abut a periphery of said coupling;

a linkage received in said recess and pivotally mounted on said lever and penetrated by said pin, and having a first end abutting said locking pin when said locking device is in said locked position and passing over said locking pin when said locking device is in said unlocked position, and a second end extending through said opening of said recess, and being attached to said first end of said rod; and a torsion spring pivotally mounted on said lever having a first end abutting said first end of said linkage and a second end abutting said lever and being penetrated by said pin.

* * * * *